United States Patent

Dickinson

[15] 3,647,408
[45] Mar. 7, 1972

[54] METHOD AND APPARATUS FOR MANUFACTURE OF FLOAT GLASS

[72] Inventor: George A. Dickinson, St. Helens, England
[73] Assignee: Pilkington Brothers Limited, Liverpool, England
[22] Filed: July 29, 1969
[21] Appl. No.: 845,681

[30] Foreign Application Priority Data

Aug. 12, 1968    Great Britain ..................... 38,561/68

[52] U.S. Cl. ........................................... 65/99 A, 65/182 R
[51] Int. Cl. ..................................................... C03b 18/00
[58] Field of Search ..................... 65/99, 182, 99 A, 182 R

[56] References Cited

UNITED STATES PATENTS 3,479,171  11/1969  Robinson et al. ..................... 65/182 X
3,487,659   1/1970  Ito et al. ................................. 65/99 X
3,607,203   9/1971  Fujimoto et al. ..................... 65/182 R Primary Examiner—S. Leon Bashore
Assistant Examiner—Robert L. Lindsay, Jr.
Attorney—Morrison, Kennedy & Campbell

[57] ABSTRACT

Thick float glass, e.g., from 8 mm. to 30 mm. thick, is produced by physically halting the lateral flow of the glass when it achieves a predetermined thickness, the layer of molten glass being thermally controlled by causing transverse flow of molten metal beneath the glass and then confining to the sides of the bath downstream flow of that molten metal and permitting dispersal of the confined flows of molten metal into a downstream region of the bath. This method is accomplished by a float glass apparatus having longitudinally extending fenders, the section nearer the entrance being spaced from the floor so a pump may pump liquid in the bath transverse to the sheet of glass being formed.

7 Claims, 7 Drawing Figures

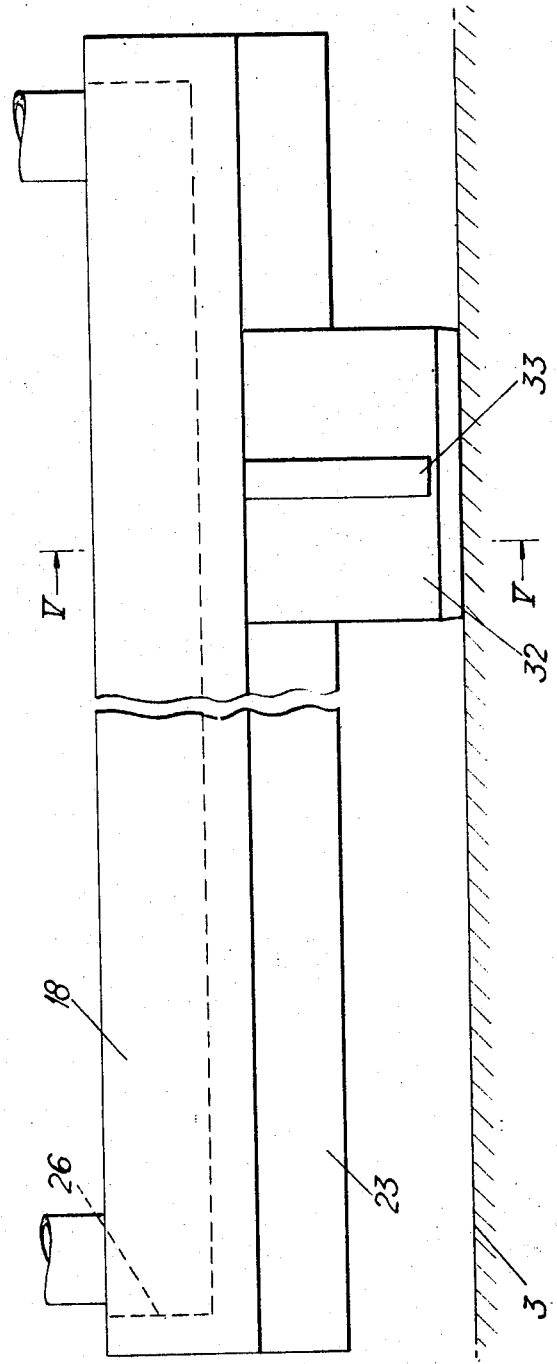

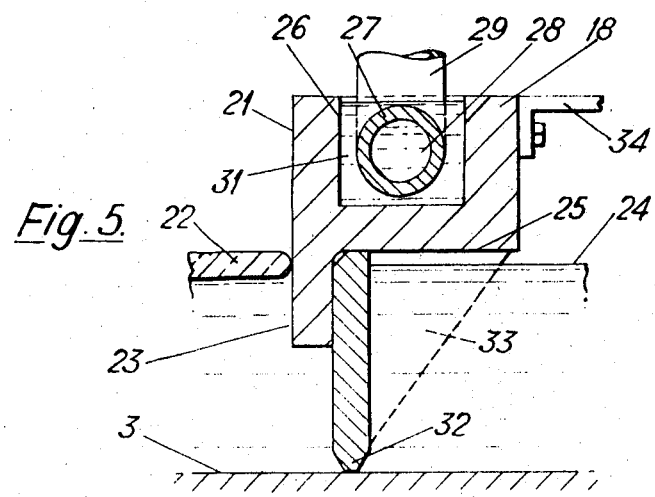
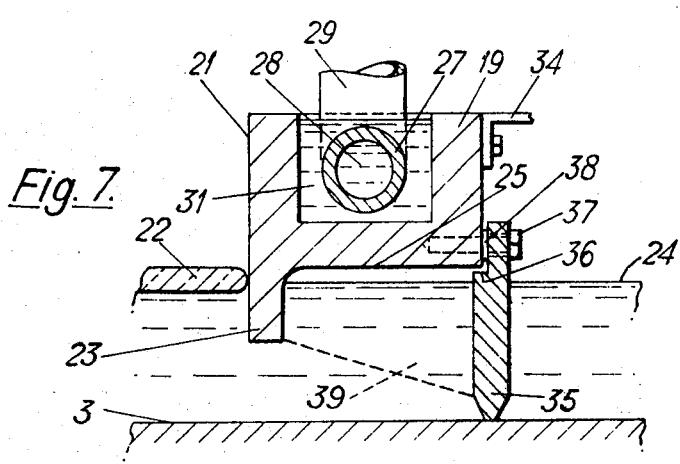

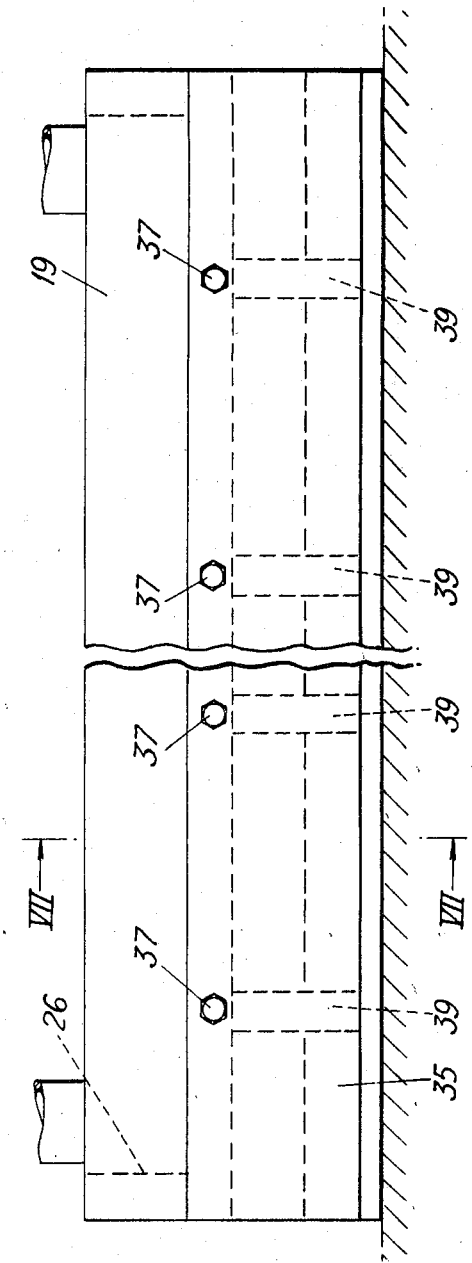

METHOD AND APPARATUS FOR MANUFACTURE OF FLOAT GLASS

BACKGROUND OF THE INVENTION

This invention relates to the manufacture of float glass by a process in which a layer of molten glass is advanced along a bath of molten metal. In the float process it is usual to establish a layer of molten glass on the bath surface and to regulate the temperature of that body so that it is permitted to flow laterally on the bath, thereby developing a buoyant body of molten glass which is advanced in ribbon form along the bath and is cooled as it is advanced until it is sufficiently stiffened to be taken unharmed from the bath.

Flat glass of about 6 mm. to 7 mm. thickness is manufactured in this way if the layer of molten glass is permitted to flow laterally unhindered to the limit of its free flow, and thicker float glass is produced by physically halting the lateral flow of the glass when the molten glass layer has spread to a desired thickness on the bath. The spreading of the glass is halted by means of fenders of nonwettable material which are adjustably mounted relative to the sidewalls of the tank structure containing the bath and are set in the bath to define a channel down the bath surface having a width which is so related to the rate of feed of glass to the bath and the rate of advance of the glass as to ensure that the flat glass of desired thickness, e.g., from 8 mm. to 30 mm. is produced.

Heat is supplied to the bath from the hot glass delivered to the bath, and when molten glass is being poured on to the bath surface there is a tendency for the central region of the bath to become considerably hotter than the sides of the bath. Thermal equalization across the whole width of the layer of molten glass confined between the fenders is desirable in order to ensure flat parallel surfaces in the thick glass produced between the fenders, and it is a main object of the present invention to improve the thermal control of the layer of molten glass where it is first settling down on the bath surface between the fenders which have checked the lateral spreading of the molten glass.

SUMMARY

According to the invention a method of manufacturing float glass in which molten glass is delivered to a bath of molten metal and is permitted to flow laterally on the bath, which lateral flow of the advancing glass is physically halted when the glass has achieved a predetermined thickness is characterized by causing a transverse flow of molten metal beneath the glass in the region where the lateral flow is halted, and confining to the sides of the bath downstream flow of that molten metal and then permitting dispersal of the confined flows of molten metal into a downstream region of the bath.

In one way of operating the invention the confined flows of molten metal are dispersed into a region of the bath where the ribbon of glass is sufficiently stiffened to hold its shape.

In this way excess heat is withdrawn from the central region of the bath in the region where the final form of the glass surface is being determined, and that excess heat is channelled away down the sides of the bath, where cooling of the side flows of molten metal takes place through the tank sidewalls, and the already cooler molten metal is dissipated in the bath in a downstream region where the thick glass produced is no longer affected by lack of thermal uniformity across the width of the bath.

A preferred method of operating the invention includes withdrawing molten metal electromagnetically from beneath the glass at both sides of the molten metal bath, and diverting the withdrawn hot molten metal down channels defined in the bath to either side of the advancing glass.

The invention also comprehends apparatus for use in the manufacture of float glass, comprising a tank structure containing a bath of molten metal, means for delivering glass to the bath at a controlled rate and advancing the glass along the bath as a molten layer which is permitted to spread laterally on the bath, fenders of a material which is not wetted by molten glass spaced from the tank sidewalls and intersecting the bath surface so as to halt the lateral spread of the glass and then laterally confine the advancing glass, a first section of the fenders being spaced from the tank floor and the continuation of the length of the fenders extending down to the tank floor to define channels down either side of the bath segregated from the central region of the bath along which the glass layer is advanced, and means for withdrawing hot molten metal from the central region of the bath beneath the first fender sections and directing the flows of molten metal so produced down the side channels for eventual dissipation in the bath.

Preferably the whole length of the continuation of the fenders segregates the channels from the central region of the bath.

In a preferred embodiment of the invention the fenders each comprise a number of graphite trough-shaped sections which have coplanar flat faces for engagement by the edges of the layer of molten glass, means are provided for circulating cooling fluid through the trough in each section, the first section of each fender includes spacing means seated on the floor of the tank structure and spacing that section from the floor, so that molten metal can be withdrawn beneath those first sections, and the further downstream sections of each fender extend downwardly to the tank floor.

Each of said further sections may comprise a graphite plate fixed to the back of the trough-shaped section and closing the space between the fender section and the tank floor.

In the preferred embodiment the apparatus also includes two linear induction motors respectively associated with the first fender sections so as to induce flow of molten metal beneath those first sections towards the sides of the bath.

Baffles may be positioned in the bath and associated with each linear induction motor to direct the molten metal withdrawn beneath the first fender sections down the side channels defined between the further fender sections and the tank sidewalls.

The invention also includes float glass produced by the method as hereinbefore defined.

BRIEF DESCRIPTION OF THE DRAWINGS

FIG. 4 is a side elevation of the first section of one of the fenders, FIG. 5 is a section on line V—V of FIG. 4, FIG. 6 is a view similar to FIG. 4 showing the construction of each of the further sections of each fender downstream of the first sections, and FIG. 7 is a section on line VII—VII of FIG. 6.

In the drawings the same references indicate the same or similar parts.

DESCRIPTION OF THE PREFERRED EMBODIMENT

Figure 1:
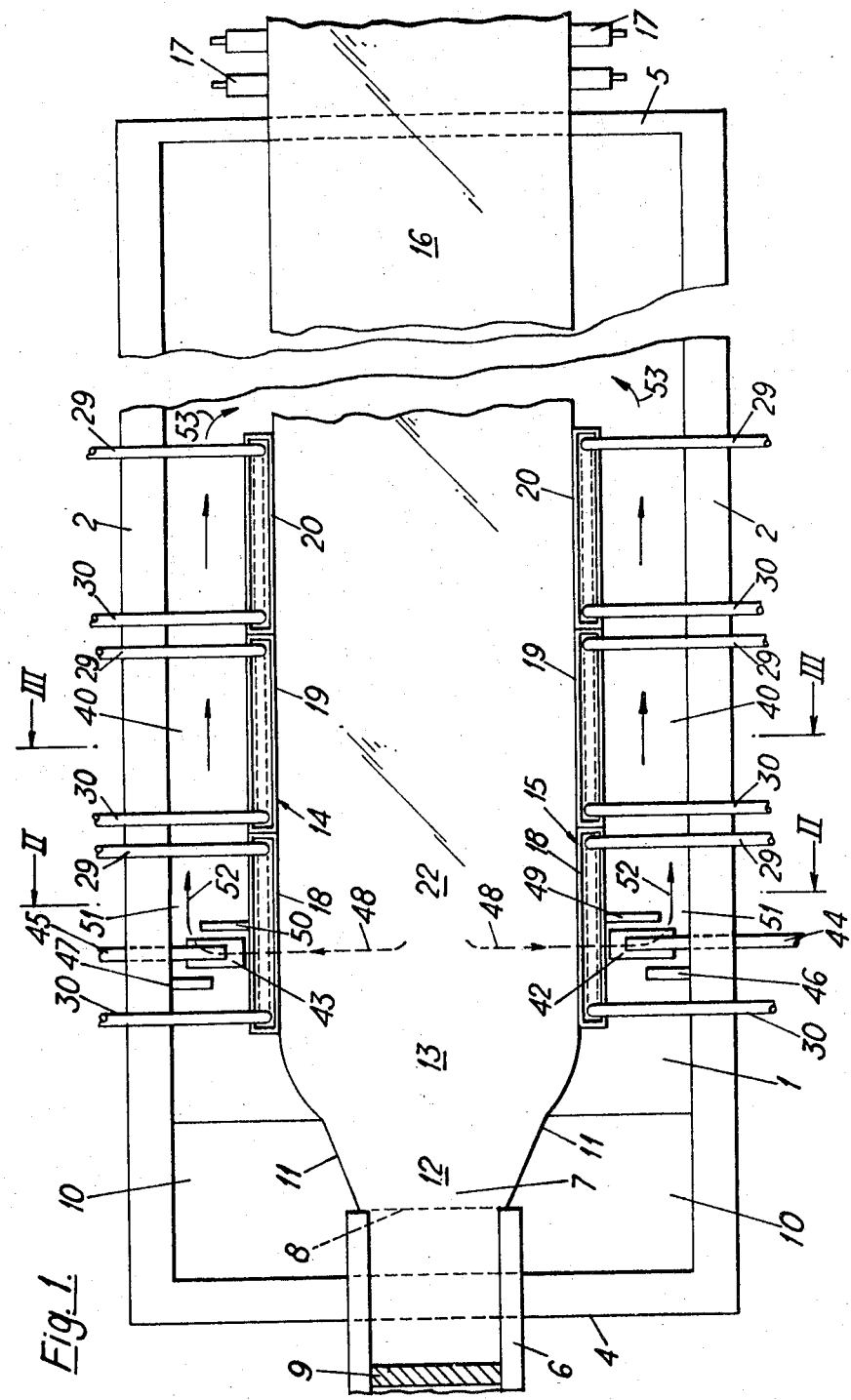
FIG. 1 is a plan view of a tank structure for use in the float process, with the roof structure removed and showing the disposition of nonwettable fenders and linear induction motors relative to the tank sidewalls.
Figure 2:
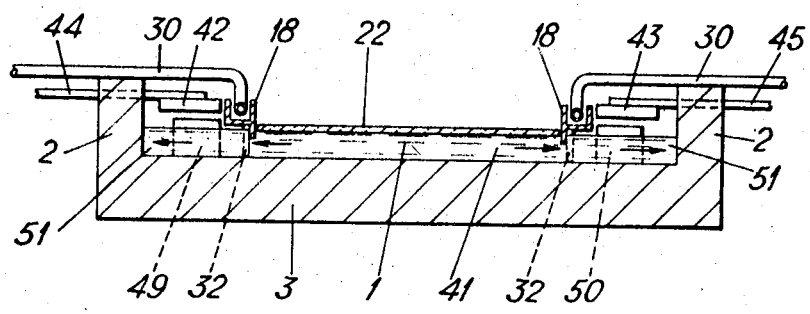
FIG. 2 is a section on line II—II of FIG. 1.
Figure 3:
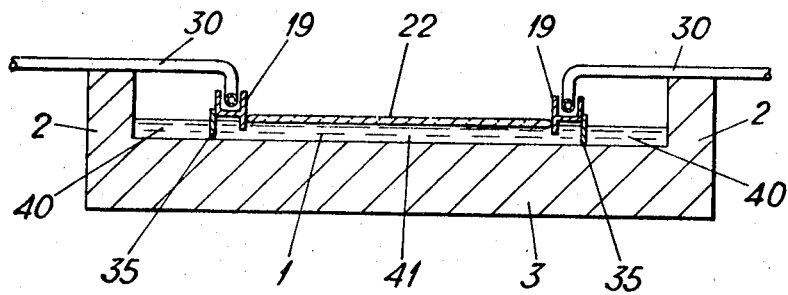
FIG. 3 is a section on line III—III of FIG. 1.

Referring to the FIGS. 1 to 3 of the drawings a bath of molten metal, for example molten tin or a tin alloy having specific gravity greater than glass, is indicated at 1. The molten metal bath is contained in a tank structure formed by integral sidewalls 2, a floor 3 and end walls 4 and 5 respectively at the inlet and outlet ends of the tank structure.

A spout 6 extends over the inlet end wall 4 and is located in the middle region of that end wall and forms an extension of a forehearth of a glass-melting furnace. A flow of molten glass 7 over the lip 8 of the spout is controlled by a tweel 9 in known manner.

At the inlet end of the tank structure there are mounted restricting walls 10 having inwardly facing surfaces 11 which confine laterally the molten glass arriving on the bath surface as it flows downwardly from the spout lip 8 at a controlled rate and advances along the surface of the bath. During this initial period of confinement the temperature of the molten glass is for example of the order of 1,000° C. and a degree of temperature equalization throughout the depth and width of the body of molten glass 12 contained between the surfaces 11 is achieved, as well as some flattening of the glass as the lower surface of the body 12 of molten glass takes up the flatness of the surface of the bath of molten metal and the top surface of the glass flattens as the glass settles down between those surfaces.

The molten glass is released from the downstream end of the surfaces and flows laterally initially unhindered, on the bath surface as a laterally spreading layer 13 of molten glass. During this spreading the flatness and distortion free qualities of the glass are enhanced while the production of the fire finish luster of the upper and lower surfaces of the glass continues.

Initially the depth of the molten glass on the bath is greater than the ultimate thickness of the glass to be produced and a uniform decrease in thickness across the whole width of the glass takes place during the lateral spreading of the glass 13. When the glass has achieved a desired thickness for example a thickness in the range 8 mm. to 30 mm. its lateral spreading is physically halted by fenders 14 and 15 extending down the bath and spaced from the sidewalls 2 of the tank so as to define a channel extending along the bath surface having a width so related to the rate of delivery of molten glass to the bath and the rate at which the ultimate ribbon of glass of desired thickness is removed from the bath, as to predicate the desired thickness for the glass achieved between the fenders 14 and 15.

During the continued advance of the glass between the fenders it is cooled until by the time it reaches the end of the channel defined by the fenders 14 and 15 it is sufficiently stiffened to hold its shape. Thereafter the glass in ribbon form is continually advanced along the bath towards the outlet end of the tank structure and during that advance is further cooled from the temperature of about 800° C. which the glass reaches by the time it has travelled to the end of the fenders 14 and 15 down to a temperature of about 600° C. which the thick glass ribbon 16 achieves by the time it reaches the outlet end of the tank structure and is sufficiently stiffened to be taken unharmed from the bath by conveyor rollers 17.

A roof structure, not shown, is supported over the tank structure in the manner well known in the float process, and a plenum of protective atmosphere is maintained in the headspace so defined over the bath so that there is outward flow of protective atmosphere through the inlet through which molten glass is advanced onto the bath and through the outlet defined over the end wall 5 through which the ultimate ribbon of glass 16 of desired thickness is discharged from the bath.

The fenders 14 and 15 are in the described embodiment each made up from three sections. The first sections 18 are of different form from the second and third sections 19 and 20 as will be described below.

The construction of the first sections 18 of the fenders is indicated in FIGS. 1 and 2 and is shown in greater detail in FIGS. 4 and 5. Each fender section 18 is a hollow trough-shaped section having a flat front face 21. The whole is formed of graphite and the flat face 21 is thus a flat graphite surface and is not wetted by the edges of the layer of molten glass which contact the face. The molten glass layer of desired thickness is indicated at 22 and the edges of this layer run freely against the faces 21 of the fender sections 18. The face 21 of each section extends downwardly as a foot 23 which dips into the surface 24 of the bath of molten metal and extends downwardly below the surface 24 of the bath for a depth which is just sufficient to ensure that under no circumstance can molten glass from the layer 22 escape beneath the fender. The bottom surface 25 of the fender section 18 is spaced above the surface level 24 of the bath. This surface may be provided with a facing of a thermally insulating refractory material for example Fibrefrax which reduces absorption of heat radiated from the surface of the molten metal, and this construction reduces the extraction of heat from the molten tin by the fender. In a trough 26 formed within the fender section 18 there is located a cooling pipe 27 through which cooling fluid 28, for example water, is circulated from a supply pipe 29 to an exhaust pipe 30. The trough 26 is filled with molten tin 31 which ensures good thermal contact between the pipe 27 and the graphite of the fender section so that there is a high rate of cooling of the face 19 which is engaged by the edge of the glass, while extraction of heat from the molten metal bath is kept to a minimum. The good thermal conductivity of the graphite assists this heat exchange and ensures an excellent nonwetting characteristic at the interface between the edge of the glass 22 and the face 19. Conduction of heat from the bath by the fender section 18 is kept to a minimum because only the foot 23 is in contact with the molten metal of the bath.

The fender section 18 is supported above the floor 3 of the tank structure by a spacer leg 32 which is seated on the tank floor and is strengthened by a rib 33 The leg 32 and its rib 33 are cemented to the main trough-shaped part of the fender section, and location of the sections may be assisted by angle stays 34 of insulating material fixed to the tank sidewalls.

The further sections 19 and 20 of the fenders which lie downstream of the first fender sections 18 each have the construction illustrated in FIGS. 6 and 7. Each fender section 19 and 20 includes a hollow trough-shaped graphite member identical with the member 18 in shape and disposition in the bath so that the front flat faces 21 of all the fender sections form continuous walls against which the edges of the layer 22 of molten glass freely slide as the layer is cooled by thermal regulators associated with the bath, until by the time the thick glass ribbon reaches the downstream end of the fender sections 20 is sufficiently viscous to hold its width and thickness and is advanced towards the outlet end of the bath as indicated at 16.

Each of the fender sections 19 and 20 comprises a graphite plate 35, FIGS. 6 and 7, fixed to the back of the trough-shaped graphite section. The top of the plate is rabbeted at 36 so as to fit to the corner of the section 19 and is fixed by bolts 37; a spacer washer 38 of thermally insulating material spaces the plate 35 from the main part of the fender section so that there is a narrow airgap between the fender section and the plate, and heat extraction from the bath via the plate 35 is kept to a minimum.

The plate is stiffened by ribs 39 and when all the fender sections are in position is seated on the floor 3 of the tank structure. Thus the space between the fender sections 19 and 20 and the floor 3 of the tank structure is closed completely and channels 40 are defined down either side of the bath segregated from the central region 41 of the bath on which the layer of glass 22 is supported.

Two linear induction motors 42 and 43 are respectively mounted above the surface of the bath between the sidewalls 2 of the tank structure and the fender sections 18 just downstream of the beginning of the fenders where the laterally flowing glass 13 has been physically halted by the engagement of the edges of the layer of molten glass with the faces 21 of the fender sections 18. The linear induction motors are mounted on support beams 44 and 45 which pass through the sidewalls 2 of the tank structure and hold the induction motors 34 and 35 with their lower faces just above the surface level of the bath. The motors are protected from the heat of the bath by refractory casings. Supply pipes for cooling water to the windings of the motors and the electrical connections to the motors are carried by the beams 44 and 45 and means, not shown, are provided for tilting the support beams so as to adjust the height of the bottom of the motors 42 and 43 above the surface 25 of the bath. This adjusts the depth of penetration of the fields of the motors into the molten metal, for a given value of current supplied to the motors and so controls the depth of molten metal which is pumped by the motors. Alternatively the strength of the current supplied to the motors may be adjusted so as to control the pumping force acting on the molten metal at a given depth in the bath just behind the fender sections 18.

Just upstream of the motors 42 and 43 there are respectively mounted baffle walls 46 and 47 which project inwardly into the bath from the tank sidewalls 2 and extend from the bath surface right down to the floor 3 of a tank structure. Each of these baffle walls 46 and 47 may be in the form of a hollow rectangular graphite member which is sunk in the bath and filled with molten tin which weights it in position resting on the floor of the tank structure. By operation of the motors 42 and 43 there is continuous withdrawal of molten metal of the bath from beneath the layer of molten glass 22 whose lateral spreading has been halted by the fender sections 18. The transverse flows of molten metal to either side of the bath are indicated at 48.

The baffle surfaces of the sunk walls 46 and 47 just upstream of the motor 42 and 43 stops molten metal from the flows 48 from drifting upstream towards the inlet end wall 4 and deflects the flows 48 down the sides of the bath of molten metal.

To assist this deflection of the flows of molten metal 48 into the channels 40 defined down the sides of the bath there are provided further sunk baffles 49 and 50 extending outwardly towards the tank sidewalls 2 from the backs of the fender sections 18. These baffles 49 and 50 are also hollow graphite blocks sunk in the bath by being filled with molten tin. The gaps 51 between the ends of the baffles 49 and 50 and the tank sidewalls ensures a channelling of the molten metal flows 48 down the sides of the bath as indicated by the arrows 52.

There is thus continuous withdrawal of hot molten metal from beneath the layer of glass where the metal of the bath is continually being supplied with heat from the molten glass delivered to the bath, and this hot molten metal is channelled down the sides of the bath of molten metal into the channels 40 and is completely segregated from the central part 41 of the bath through which there is a gradual upstream flow of cooler molten metal which is gradually heated as it moves upstream to replace the flows 48 withdrawn transversely by the motors 42 and 43.

The hot molten metal flowing into the channels 40 is gradually cooling as it flows towards the downstream ends of the fenders 14 and 15. Thereafter the flows of molten metal disperse, as indicated by arrows 53 into the general area of the bath where the ribbon of glass is advancing unconfined along the bath surface and this molten metal released from the channels 40 mingles with the molten metal which is being slowly drawn upstream along the central part 41 of the bath.

The linear induction motors 42 and 43 can be adjusted separately or together in order to preserve the symmetry of the transverse flows 48 of the molten metal and the spreading of the molten glass 13 on the metal surface.

Heat extraction from the front faces 21 of the fender sections may be achieved by forming the trough in the fender section with a groove extending downwardly into the foot and in proximity to the front face 21 engaged by the glass. This construction provides enhanced extraction of heat from the region of the faces 21 contacted by the edges of the glass thereby ensuring good nonwetting qualities for those faces.

The pipes 27 for circulating cooling fluid may be dispensed with and the molten tin may be directly circulated through the troughs in the fender sections. Alternatively, the pipes 27 may be employed for the circulation of cooling gas, or the troughs may be completely enclosed and cooling gas circulated through the ducts so formed in the fenders.

We claim:

1. A method of manufacturing float glass, comprising delivering molten glass to a bath of molten metal, permitting the glass to flow laterally on the bath, physically halting the lateral flow of the advancing glass when the glass has achieved a predetermined thickness, laterally confining the glass having that predetermined thickness as its advance continues along a predetermined confinement zone, continuously withdrawing transverse flows of molten metal, downstream of the location of physical halting of the lateral flow of the glass, towards the sides of the bath beneath the laterally confined glass channelling said transverse flows towards the bath sides, deflecting said channelled transverse flows into downstream flows along the bath sides, confining said downstream flows to the sides of the bath along to a region of the bath where the ribbon of glass is sufficiently stiffened to hold its shape, and then dispersing the confined flows of molten metal into that downstream region of the bath.

2. Apparatus for use in the manufacture of float glass, comprising a tank structure containing a bath of molten metal, means for delivering glass to the bath at a controlled rate and advancing the glass along the bath as a molten layer which is permitted to spread laterally on the bath, longitudinally extending fenders of a material which is not wetted by molten glass spaced from the tank sidewalls and intersecting the bath surface so as to halt the lateral spread of the glass and then laterally confine the advancing glass throughout the longitudinal extent of such fenders, a first section of the longitudinally extending fenders adjacent one end thereof being spaced from the tank floor to define entrances to channels defined down either side of the bath by said fenders and the continuation of the length of the fenders toward the other end thereof extending down to the tank floor to define said channels segregated by said continuation of the fenders from the central region of the bath along which the glass layer is advanced, molten metal pumping means positioned between the tank structure and said first fender sections forwardly of said one end thereof for withdrawing transverse flows of hot molten metal from the central region of the bath through said entrances beneath the first fender sections, and means for directing the flows of molten metal so produced down the side channels for eventual dissipation in the bath.

3. A method according to claim 1, including withdrawing molten metal electromagnetically from beneath the glass at both sides of the molten metal bath through entrances to channels defined in the bath to either side of the advancing glass.

4. Apparatus according to claim 2, wherein the fenders each comprise a number of graphite trough-shaped sections which have coplanar flat faces for engagement by the edges of the layer of molten glass, means are provided for circulating cooling fluid through the trough in each section, the first section of each fender includes spacing means seated on the floor of the tank structure and spacing that section from the floor, so that molten metal can be withdrawn beneath those first sections, and the further downstream sections of each fender extend downwardly to the tank floor.

5. Apparatus according to claim 4, wherein each of said further sections comprises a graphite plate fixed to the back of the trough-shaped section and closing the space between the fender section and the tank floor.

6. Apparatus according to claim 2, wherein the molten metal pumping means comprises two linear induction motors respectively mounted between the first fender sections and the tank sidewalls to induce flow of molten metal beneath those first sections towards the sides of the bath.

7. Apparatus according to claim 6, including baffles in the bath associated with each linear induction motor to direct the molten metal withdrawn beneath the first fender sections down the side channels defined between the further fender sections and the tank sidewalls.

* * * * *